Oct. 9, 1923.
A. C. RECKER
1,470,189
INSULATED SUSPENSION STEM FOR ELECTRIC LIGHTING FIXTURES,
Filed Aug. 12, 1922
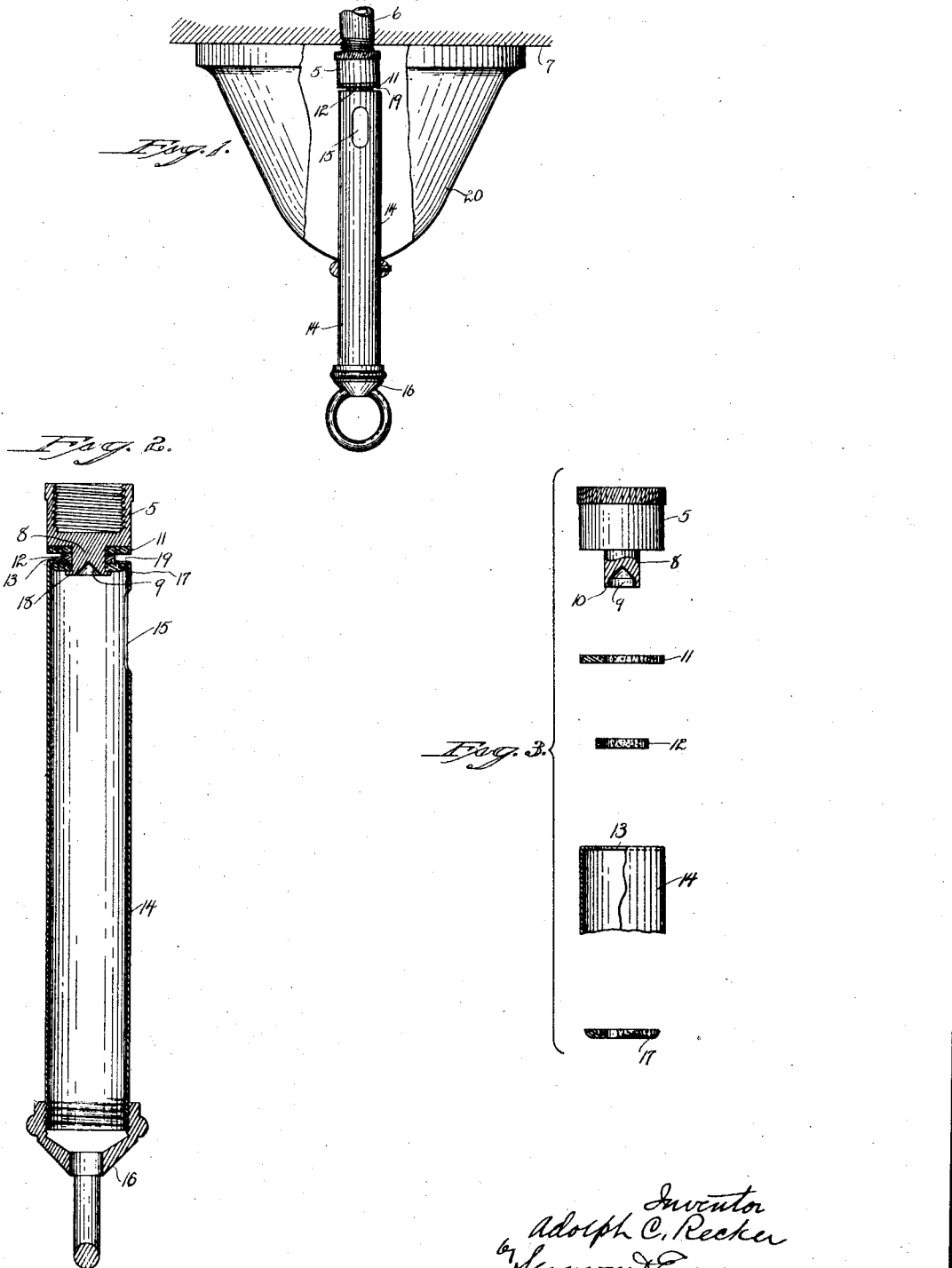

Patented Oct. 9, 1923.

1,470,189

UNITED STATES PATENT OFFICE.

ADOLPH C. RECKER, OF OAKVILLE, CONNECTICUT, ASSIGNOR TO CHASE COMPANIES, INC., OF WATERBURY, CONNECTICUT, A CORPORATION.

INSULATED SUSPENSION STEM FOR ELECTRIC-LIGHTING FIXTURES.

Application filed August 12, 1922. Serial No. 581,341.

*To all whom it may concern:*

Be it known that I, ADOLPH C. RECKER, a citizen of the United States, residing at Oakville, in the county of Litchfield and State of Connecticut, have invented a new and useful Improvement in Insulated Suspension Stems for Electric-Lighting Fixtures; and I do hereby declare the following, when taken in connection with the accompanying drawings and the characters of reference marked thereon, to be a full, clear, and exact description of the same, and which said drawings constitute part of this application, and represent, in—

Fig. 1 a view in side elevation of an insulated suspension-stem for electric lighting fixtures, constructed in accordance with my invention and shown as installed upon a conduit-pipe of crooked presentation, with the canopy partly broken away.

Fig. 2 a view of the fixture in central longitudinal section.

Fig. 3 a view comprising the several elements of the flexible or articulated insulated joint of the fixture, these being separated but arranged in the order of their assemblance.

My invention relates to an improvement in insulated suspension-stems for electric lighting fixtures, the object being to provide a simple and efficient fixture of the character described, constructed with particular reference to adapting it to compensate for any crookedness in the installation of the outlet, such as a crow-foot or conduit-pipe to which it is applied.

With these ends in view, my invention consists in an insulated suspension-stem for electric lighting fixtures, having certain details of construction and combination of parts as will be hereinafter described and particularly pointed out in the claims.

In carrying out my invention, as herein shown, I employ a standardized internally-threaded cap 5 adapted to be screwed over an outlet such as a conduit-pipe 6 installed in a ceiling 7, or over a standard crow-foot or other equivalent outlet. As shown, the conduit-pipe 6 is crooked in its presentation, i. e., it does not stand at a right angle to the plane of the ceiling 7. At its lower end, the cap 5 is formed with a heavy concentric shank 8 formed, in its lower end, with a concentric recess 9 producing a relatively thin annular wall 10. Over the said stem 8 I pass an upper insulating washer 11 of fibrous or other equivalent material, by preference corresponding in diameter to the diameter of the cap. I then pass over the stem a fibrous spacing-washer 12 of smaller diameter than the said washer and preferably thicker than the same. The end of the shank is then passed through a central opening 13 formed in the upper end of the tubular sheet-metal stem 14 formed near its upper end with a lateral wiring-opening 15 and having its lower end threaded for the application to it of a suspension-loop fitting 16 of any approved construction. After the shank 8 has been passed through the opening 13, a lower insulating washer 17, introduced into the stem 14, is passed over it and brought to a bearing upon the lower face of the inwardly-turned upper end of the tubular stem, this washer being also larger in diameter than the washer 11, but, as shown, somewhat smaller in diameter than the washer 17. The wall 10 of the shank is now expanded to form a retaining-flange 18, by which the parts are held together. The smaller intermediate spacing-washer 12 aforesaid results in the production of an annular clearance space 19 between the lower face of the upper insulating washer 11 and the upper face of the lower insulating washer 17, the inwardly-turned upper end of the stem entering this space and having play therein, as clearly shown in Fig. 2. A flexible or articulated connection is thus established between the cap 5 and the tubular stem 14, permitting them to be rocked one with respect to the other, without impairing their connection or insulation. Now, in case the fixture is applied to a conduit pipe, or crow-foot or other outlet, which has by chance been crookedly installed, such as the pipe 6, in the ceiling 7, the cap 5 will be applied thereto in the usual manner, and align itself therewith. However, when the canopy 20 is applied over the stem 14, and seated squarely upon the ceiling 7, the stem, being flexibly connected with the cap, will take a position coincident with the axis of the canopy, so as to stand at a true right angle to the face of the ceiling, but out of line with the axis of the pipe 6 and cap 5. As shown, the cap 5, with its stem 8 and the washers 11, 12 and 17, constitute what may be called a "mounting-member" having an annular clearance-space 19, which receives the inwardly-turned flange produced by forming the central opening 13 in the upper end of the stem 14, the said space 19 being enough wider than the thickness of the said flange to permit a rocking or canting movement of the flange in the said space, in case the exigencies of installing the fixture necessitate throwing the stem 14 out of axial alignment with the said mounting-member.

I am thus enabled, by means of my invention, to compensate for an improperly installed conduit pipe or crow-foot, or whatever outlet the suspension-stem may be attached to, as well as to provide effective insulation therefrom.

I claim:

1. In an insulated suspension-stem for electric lighting fixtures, the combination with a mounting-member, of a tubular stem permanently connected therewith and depending therefrom, and provided at its upper end with an inwardly-turned flange, and insulating material interposed between the said member and tube at points above and below the said flange to form an outwardly-opening clearance-space which the flange enters, with freedom for canting movement therein.

2. In an insulated suspension-stem for electric lighting fixtures, the combination with an internally-threaded cap provided at its lower end with a concentric recessed shank, of a tubular stem formed at its upper end with a concentric opening for the reception of the said shank, a suspension loop applied to the lower end of the stem, an upper insulating washer applied to the stem to bear upon the lower face of the cap, a lower insulating washer located within the upper end of the tubular stem to bear upon the upper end thereof, and a spacing-washer located between the two washers aforesaid and smaller in diameter than the same, the projecting lower end of the shank being expanded to engage with the washer within the tubular stem for holding the said parts together, whereby a clearance space is formed between the upper and lower washers to permit the cap and stem to be thrown out of alignment with each other without impairing the insulation between them.

In testimony whereof, I have signed this specification in the presence of two subscribing witnesses.

ADOLPH C. RECKER.

Witnesses:
 JOHN S. NEAGLE,
 L. H. COTTER.